May 22, 1923.　　　　　　　　　　　　　　　　　　　1,456,377
K. HARRIED
ANIMAL TRAP
Filed Feb. 2, 1923　　　　　　　2 Sheets-Sheet 2
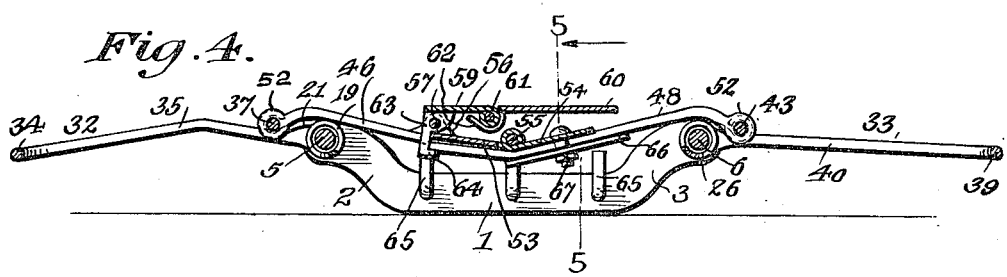
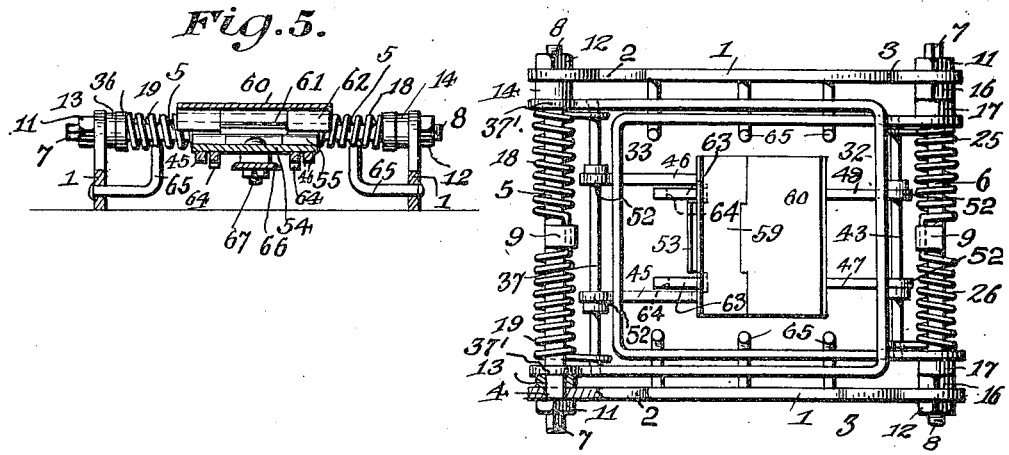
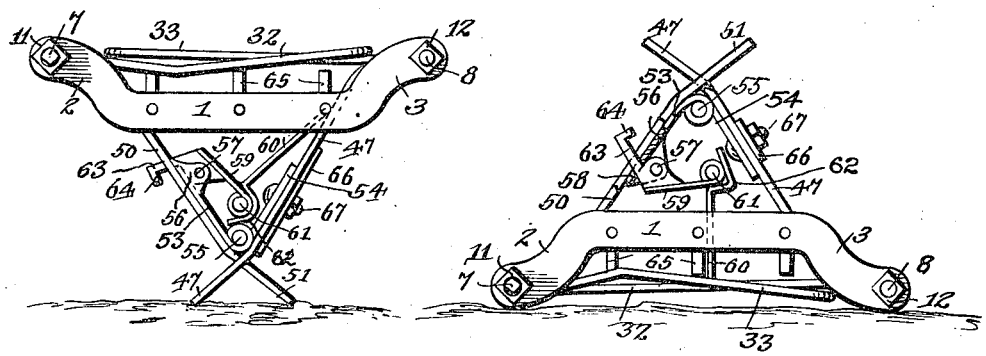
INVENTOR.
Knute Harried,
BY
Geo. S. Kimmel, ATTORNEY.

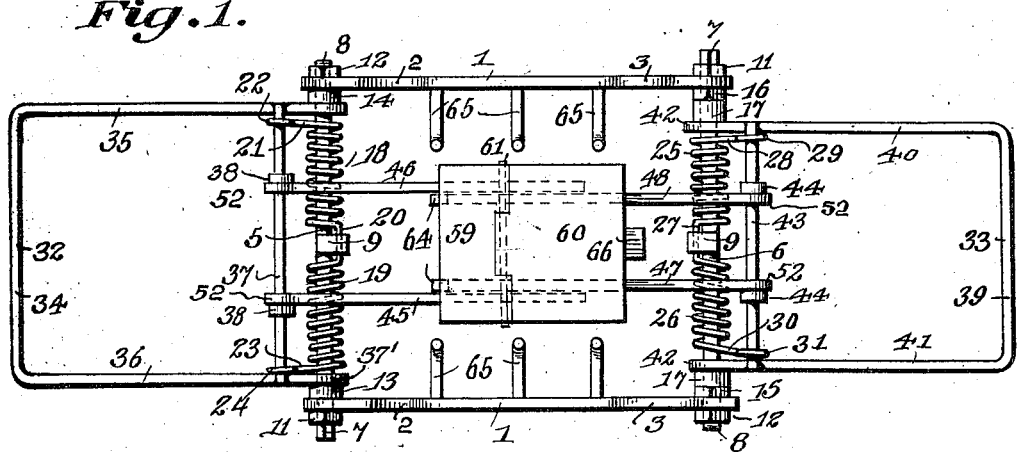
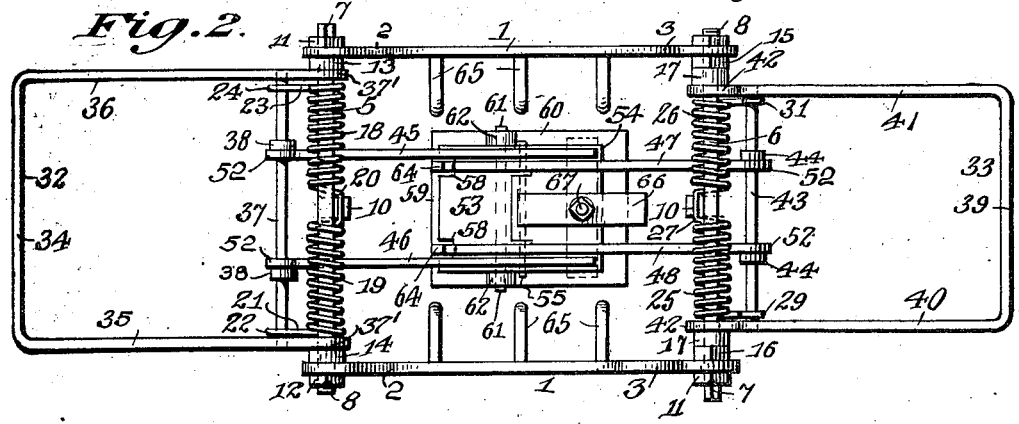
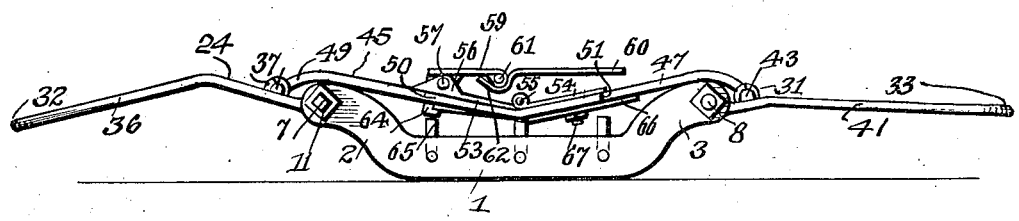

Patented May 22, 1923.

1,456,377

UNITED STATES PATENT OFFICE.

KNUTE HARRIED, OF SACRED HEART, MINNESOTA.

ANIMAL TRAP.

Application filed February 2, 1923. Serial No. 616,569.

*To all whom it may concern:*

Be it known that I, KNUTE HARRIED, a citizen of Canada, residing at Sacred Heart, in the county of Renville and State of Minnesota, have invented certain new and useful Improvements in Animal Traps, of which the following is a specification.

This invention relates to animal traps, and has for its object to provide a trap of such class, in a manner as hereinafter set forth, with a pair of normally locked spring controlled releasable gripping jaws of such construction and power as to provide for the grabbing and exerting of a quick crushing action on an animal to an extent to instantly kill it without danger to the fur, under such conditions overcoming the suffering inflicted upon an animal when its foot or leg is caught in the trap as in a majority of cases the animal remains in the trap for quite an indefinite period before it is removed.

A further object of the invention is to provide, in a manner as hereinafter set forth, a trap having a body portion provided with a pair of normally locked spring controlled releasable gripping jaws and further including means, when the jaws are released, for instantly raising or imparting what may be termed a jumping-up action of the trap towards the animal, thereby quickly facilitating the action of grabbing or gripping it by the jaws of the trap and killing the animal.

A further object of the invention is to provide, in a manner as hereinafter set forth, a trap for the purpose referred to having a pair of independently spring controlled releasable jaws, movable when released to overlapping position with respect to each other and whereby the tension or pressure applied to each jaw is combined and applied to the inner jaw when the jaws are in overlapping position, and further including means whereby the tension of the springs cooperating with the gripping jaws can be adjusted to the desired degree.

A further object of the invention is to provide, in a manner as hereinafter set forth, a trap having means capable of being adjusted to prevent the springing of the trap when set, so that the latter when in set position can be handled without danger until said means is shifted from what may be termed locking position.

Further objects of the invention are to provide a trap for the purpose set forth, which is simple in its construction and arrangement, strong, durable, efficient in its use, conveniently set, readily assembled and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of an animal trap in accordance with this invention, illustrating the same in set position.

Figure 2 is an inverted plan of the trap when in set position.

Figure 3 is a side view of the trap when set.

Figure 4 is a longitudinal sectional view of the trap when set.

Figure 5 is a section on line 5—5, Figure 4.

Figure 6 is a side view of the trap when sprung.

Figure 7 is a top plan view of the trap when sprung.

Figure 8 is an inverted view, partially in section, of the trap when sprung.

A trap in accordance with this invention includes a body portion formed from a pair of complemental side members and a pair of complemental end members. Each of the side members consists of an intermediate portion 1 and a pair of end portions 2, 3. The end portions 2, 3, extend upwardly and outwardly at an inclination with respect to the intermediate portion 1, and further extend in opposite directions with respect to each other, and by this arrangement the medial portion of the side members is arranged below the end portions thereof and provides a support when the trap is positioned on the ground. Each of the end portions 2, 3, has its upper end provided with an opening 4. When the side members are mounted in position the openings 4 of one side member are arranged in alignment with the openings 4 in the other side member.

The end members are indicated at 5, 6, and each of which consists of an elongated bar having one end polygonal in contour as at 7, and its other end provided with peripheral threads 8. The end members when set up are extended through the aligning openings 4 of the side members and are oppositely disposed with respect to each other as clearly shown in Figure 7. Each of the end members, centrally thereof, is provided with an inwardly extending lug 9, provided with a lip 10. Each of the end members, inwardly with respect to the polygonal-shaped end 7 but exteriorly with respect to a side member, carries a head piece 11, which abuts against the outer face of the side member and each of the end members at the threaded terminus thereof is provided with a securing nut 12 which abuts against the outer face of a side member.

The end member 5 is provided with a pair of nuts 13, 14, which abut against the inner face of the side members, and the end member 6 is provided with a pair of nuts 15, 16, which abut against the inner face of the side members and the said end member 6 is furthermore provided with a pair of spacing collars 17, one of which abuts against the nut 15 and the other of which abuts against the nut 16.

The nuts 12, 13, 14, 15 and 16, in connection with the head pieces 11, are employed for fixedly clamping the end members to the side members, but when the nuts are loosened the end members can be rotated for the purpose of increasing or decreasing the tension of the power exerting or jaw shifting springs to be hereinafter referred to.

Mounted on the end member 5, is a power exerting spring formed of two sets of coils 18, 19. The coils of one set extend in an opposite direction with respect to the coils of the other set and the opposed ends of the said sets of coils are connected together by a coupling member 20, which extends against the lip 10, on the lug 9, and secures the power exerting spring to the end member 5. The outer end of the set of coils 18 is extended as at 21, and has the free terminal portion thereof in the form of a hook as at 22. The outer end of the set of coils 19 is extended as at 23 and has the free terminal portion thereof in the form of a hook as at 24.

Mounted on the end member 6 is a power exerting spring formed of two sets of coils 25, 26. The coils of one set are oppositely disposed with respect to the coils of the other set and the opposed ends of the sets of coils are connected together by a coupling member 27, which extends against the lip 10, on the lug 9 of the end member 6, and provides means for anchoring or connecting the spring to the said end member 6.

The outer end of the set of coils 25 is extended as at 28, and the free terminal portion thereof is in the form of a hook, as at 29. The outer end of the set of coils 26 is extended as at 30, and the free terminal portion thereof is in the form of a hook as at 31.

The trap includes a pair of oppositely disposed grabbing or gripping jaws, each of which is substantially yoke-shaped, and one of said jaws is referred to generally by the reference character 32, and the other generally by the reference character 33. The jaw 32 is of larger size than the jaw 33, and when the trap is sprung and the jaws shifted to grab the animal the jaw 32 overlaps the jaw 33 and the pressure exerted on the jaw 33 by its power exerting spring is augmented by the power exerting spring of the law 32.

The jaw 32 consists of an end bar 34, which has projecting therefrom a pair of side bars 35, 36, and each of the latter has its free end looped as at 37' and through the looped ends of the bars 35, 36, extends the end member 5. Each of the bars 35, 36, is angle shaped as more clearly shown in Figure 3, and the said bars 35, 36, have secured thereto, in proximity to the looped ends thereof, a transversely extending cross member 37. The member 37, at a point between its center and each end thereof, is provided with a stop collar 38. The hooked terminal portions 22, 24, of the extended ends 21, 23, of the coils 18 and 19 engage over the connecting member 37.

The jaw 33 consists of an end bar 39, which has projecting therefrom a pair of side bars 40, 41, and each of the latter has its free end looped as at 42, and through the looped ends of the bars 40, 41, extends the end member 6. Each of the bars 40, 41, has secured thereto, in proximity to the looped end 42 thereof, a transversely extending cross member 43. The member 43, at a point between its center and each end thereof, is provided with a stop collar 44. The hooked terminal portions 29, 31, of the extended ends 28, 30, of the coils 25, 26, engage over the connecting member 43.

The nuts 13, 14, bear against the looped ends 37 of the bars 35, 36, of the jaw 32 and the spacing collars 17 bear against the looped ends 42 of bars 40, 41 of the jaws 33.

The trap includes a tripping mechanism to release the power exerting springs so that the gripping jaws 32, 33, will be shifted over the body portion in a manner as indicated by Figure 7 of the drawings, and the said tripping mechanism comprises two pair of holding arms and the arms of one pair are indicated at 45, 46, and the arms of the other pair at 47, 48. The arms of each pair are of the same contour and each of the arms of each pair, as clearly shown in Figure 3, has a curved outer portion 49, a straight intermediate portion 50 and an upwardly inclined inner portion 51. Each of the arms of each pair has a looped outer portion 52. The looped outer portions 52 of the arms 45, 46, are mounted on the connecting member 37 and abut against the collars 38, and the said arms 45, 46, extend inwardly from the connecting member 37. The looped outer portions 52 of the arms 47, 48, are mounted on the connecting member 43, against the stop collars 44, and the said arms 47, 48, extend inwardly from the connecting member 43 and are furthermore arranged between the arms 45, 46.

The arms 45, 46, 47 and 48 not only possess what may be termed a holding function for the jaws 32, 33, against the action of the power exerting springs when the trap is set, but also possess the function of elevating or causing the trap to jump up when the tripping mechanism is released to provide for the springing of the trap.

The arms 45, 46, are hinged to the arms 47, 48, and for such purpose a hinged element is employed formed of two sections 53, 54, hinged together by a pintle 55. The section 53 is secured to the intermediate portion 50 of the arms 45, 46, and the section 54 is secured to the intermediate portion 50 of the arms 47, 48. The section 53, at its lower portion terminates at the point of joinder between the intermediate portion 50 and the end portion 51 of the arms 45, 46, and the section 54 at the lower end terminates at the point of joinder between the intermediate portion 50 and inner portion 51 of the arms 47, 48, and by this arrangement the hinged element pivots at the lower termini of the portions 50 of the holding arms.

The section 53 of the hinged element is provided with a pair of vertically disposed lugs 56, each extending outwardly with respect to the upper end of the section 53, and the extended portions of the lugs 56 are seated on the intermediate portion 50 of the holding arms 45 and 46. Mounted in the lugs 56, is a pivot bar 57, which is disposed transversely with respect to the holding arms 45, 46. The section 53 of the hinged element, at the upper end, is furthermore provided with a pair of notches 58 to provide a clearance for a purpose to be presently referred to.

The tripping mechanism includes a trip pan formed of a pair of sections 59, 60, hinged together as at 61 and with the section 60 provided with a pair of lugs 62, which engage with the section 59 and act as a stop for the purpose of maintaining the trip pan extended, when the trap is set and in the position as shown in Figure 3. The section 59 has depending therefrom a pair of setting arms 63, having hook-shaped lower ends 64 for engagement with the inner portions 51 of the arms 47, 48, for the purpose of maintaining the trap in set position and against the action of the power exerting springs for the grabbing or gripping jaws 32, 33. The setting arms 63 are pivotally mounted on the pivot rod 57, and extend through the notches 58.

Cooperating with the jaws 32, 33, to set up a clutching action on the animal, are two sets of abutment arms 65, and each of which is angle-shaped in contour. One set of arms is secured to and projects inwardly from the intermediate portion 1, of one side member, and the other set of abutment arms is secured to and projects inwardly from the intermediate portion 1 of the other side member. The horizontal leg of each of the abutment arms is secured to the intermediate portion 1 of an end member. The abutment arms of each set are arranged in spaced relation and by way of example, each set is shown as consisting of three arms but this number can be increased or diminished if desired. The vertical legs of the abutment arms are spaced from the sides of the trip pan and when the trap is sprung, the elements thereof will assume the position as shown in Figure 6, whereby the abutment arms will be extended above the trip pan and cooperate with the gripping jaws to set up a crushing action to kill the animal.

As the trip pan is formed of two hinged sections, it will readily fold as shown in Figures 7 and 8, so as not to interfere with the folding movement of the holding arms as the body portion of the trap is shifted upwardly carrying the gripping or grabbing jaws and abutment arms therewith.

When the trap is set, the gripping jaws 32, 33, are extended in a manner as shown in Figures 1 to 4, and the setting arms 63 positioned to engage under the inner ends of the holding arms 47, 48, as shown in Figures 3 and 4, and the trap is maintained in the position shown in Figure 1, until the trip pan is actuated to shift the arms 63 from engagement with the arms 47, 48, which releases the trap and causes the power exerting springs to shift the gripping jaws to the position shown in Figure 7, and to grab the animal. When the arms 47, 48, are released from the arms 63, and as the jaws move to overlapping position, the action of the arms 45, 46, 47 and 48 will impart what may be termed a jumping action, causing the trap to jump towards the animal simultaneously with the grabbing of the animal by the jaws 32, 33.

The power of the springs which cooperate with the jaws 32, 33, is such as to exert a crushing action, in connection with the arms 65 to instantly kill the animal.

To provide for securing the trap in set position so that it cannot be accidentally sprung while positioning the trap or handling it for any desired purpose, a locking member 66 is employed for such purpose and the said member 66 consists of a rectangular bar which is pivotally connected as at 67, to the section 54 of the hinge, and the said member 66 can be shifted to the position shown in dotted lines, Figure 2, so as to extend over the inner ends of the arms 45, 46, and the intermediate portion 50 of the arms 47, 48, thereby locking the holding arms from movement. This sets up what may be termed a safety so that the trap can be carried in set position.

The trip is so arranged that the pressure of the springs comes just a trifle off center so as to provide what may be termed an easy trip. The trap when set can be positioned or submerged in mud and the mud will not prevent its operation, due to the fact that the hinged element provides what may be termed an auxiliary pan positioned under the trip pan and which will protect the latter as well as preventing it from becoming clogged.

The trap can be covered to a great extent to conceal it without interfering with the operation of the same due to the fact that the central portion of the trap operates downwardly or rather the tripping mechanism operates downwardly and not upwardly toward and through the cover, then further it is not necessary to employ a chain to hold the trap, or to stake the trap down unless the trap is positioned close to deep water.

From the foregoing description taken in connection with the accompanying drawings, a construction of animal trap is set up embodying means for not only trapping but instantly killing an animal due to a clutching action, and although the preferred embodiment of the invention is as described and illustrated, yet it is to be understood that changes in the details of construction can be had without departing from the spirit of the invention as claimed.

What I claim is:—

1. An animal trap comprising a body portion, a pair of oppositely extending spring controlled gripping jaws carried thereby, and a tripping mechanism engageable with said jaws for maintaining them in set position and including means for imparting a jumping movement to the body portion when released from the jaws, said jaws when released movable to overlapping position, one of said jaws being smaller than the other, and each of said jaws being substantially yoke-shaped.

2. An animal trap comprising a body portion, a pair of oppositely extending spring controlled jaws pivotally connected to said body portion, power exerting springs carried by the body portion and connected with said jaws, oppositely extending holding arms hinged together and connected to said jaws, and a trip pan arranged above said arms and provided with means releasably engaging with certain of said arms for maintaining the jaws extended against the action of their springs.

3. An animal trap comprising a body portion, a pair of oppositely extending spring controlled jaws pivotally connected to said body portion, power exerting springs carried by the body portion and connected with said jaws, oppositely extending holding arms hinged together and connected to said jaws, and a trip pan arranged above said arms and provided with means releasably engaging with certain of said arms for maintaining the jaws extended against the action of their springs, the hinged connection between said arms arranged below said pan and intermediate the ends of said arms whereby when said means is released from the arms these latter will impart a jumping action to the body portion.

In testimony whereof, I affix my signature hereto.

KNUTE HARRIED.